(12) United States Patent
Kim et al.

(10) Patent No.: US 10,503,014 B2
(45) Date of Patent: Dec. 10, 2019

(54) LIQUID CRYSTAL DISPLAY COMPRISING FIRST AND SECOND COLOR CONVERSION LAYERS AND A THIN FILM TRANSISTOR ON AN UPPER SUBSTRATE AND METHOD OF MANUFACTURING THE SAME

(71) Applicant: SAMSUNG DISPLAY CO., LTD., Yongin-si, Gyeonggi-do (KR)

(72) Inventors: Kyung-Bae Kim, Yongin-si (KR); Il Gon Kim, Yongin-si (KR); Hyun Joon Kim, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/666,945

(22) Filed: Aug. 2, 2017

(65) Prior Publication Data
US 2018/0039134 A1 Feb. 8, 2018

(30) Foreign Application Priority Data
Aug. 3, 2016 (KR) .................. 10-2016-0099122

(51) Int. Cl.
*G02F 1/1335* (2006.01)
*G02F 1/1333* (2006.01)
*G02F 1/1362* (2006.01)

(52) U.S. Cl.
CPC .. *G02F 1/133617* (2013.01); *G02F 1/133345* (2013.01); *G02F 1/133512* (2013.01); *G02F 1/133514* (2013.01); *G02F 1/133528* (2013.01); *G02F 1/136227* (2013.01); *G02F 1/133305* (2013.01); *G02F 2001/133357* (2013.01);

(Continued)

(58) Field of Classification Search
CPC ..... G02F 2001/133357; G02F 2201/56; G02F 2201/52; G02F 1/133617; G02F 2001/133548; G02F 2001/133519
See application file for complete search history.

(56) References Cited

U.S. PATENT DOCUMENTS

2003/0230972 A1* 12/2003 Cok ..................... H01L 27/3211
313/504
2012/0287381 A1* 11/2012 Li ..................... G02F 1/133617
349/106

(Continued)

FOREIGN PATENT DOCUMENTS

KR 10-1376755 B1 3/2014
KR 10-2016-0017373 A 2/2016
(Continued)

*Primary Examiner* — Paul C Lee
(74) *Attorney, Agent, or Firm* — Kile Park Reed & Houtteman PLLC

(57) ABSTRACT

A liquid crystal display according to an exemplary embodiment includes: a first substrate; a second substrate overlapping and separated from the first substrate; a liquid crystal layer between the first substrate and the second substrate; a first color conversion layer, a second color conversion layer, and a transmitting layer between the first substrate and the liquid crystal layer; a first polarization layer between the first color conversion layer and the liquid crystal layer, between the second color conversion layer and the liquid crystal layer, and between the transmitting layer and the liquid crystal layer; and a thin film transistor between the first polarization layer and the liquid crystal layer.

15 Claims, 15 Drawing Sheets

(52) U.S. Cl.
CPC ............ *G02F 2001/133519* (2013.01); *G02F 2001/133548* (2013.01); *G02F 2001/136222* (2013.01)

(56) References Cited

U.S. PATENT DOCUMENTS

2015/0022766 A1* 1/2015 Kim .................... G02F 1/13394
    349/106
2015/0103302 A1* 4/2015 Nagasawa ............. G02F 1/1339
    349/153

FOREIGN PATENT DOCUMENTS

| KR | 10-2016-0028580 A | 3/2016 |
| KR | 10-2016-0056493 A | 5/2016 |

\* cited by examiner (a)

(b)

LIQUID CRYSTAL DISPLAY COMPRISING FIRST AND SECOND COLOR CONVERSION LAYERS AND A THIN FILM TRANSISTOR ON AN UPPER SUBSTRATE AND METHOD OF MANUFACTURING THE SAME

CROSS-REFERENCE TO RELATED APPLICATION

Korean Patent Application No. 10-2016-0099122 filed on Aug. 3, 2016 in the Korean Intellectual Property Office, and entitled: "Liquid Crystal Display and Method of Manufacturing the Same," is incorporated by reference herein in its entirety.

BACKGROUND

1. Field

The present disclosure relates to a liquid crystal display and a manufacturing method thereof, and in detail, relates to a liquid crystal display in which a color conversion layer and a thin film transistor are positioned on the same substrate, and a manufacturing method thereof.

2. Description of the Related Art

A liquid crystal display used as a display device includes two field generating electrodes, a liquid crystal layer, a color filter, a polarizer, and the like. The polarizer and the color filter of the liquid crystal display decrease an amount of light output by the display device. Accordingly, to realize a display device with reduced light loss and having high efficiency, a liquid crystal display including a color conversion layer has been proposed.

SUMMARY

A liquid crystal display according to an exemplary embodiment includes: a first substrate; a second substrate facing and spaced from the first substrate; a liquid crystal layer positioned between the first substrate and the second substrate; a first color conversion layer, a second color conversion layer, and a transmitting layer between the first substrate and the liquid crystal layer; a first polarization layer between the first color conversion layer and the liquid crystal layer, between the second color conversion layer and the liquid crystal layer, and between the transmitting layer and the liquid crystal layer; and a thin film transistor between the first polarization layer and the liquid crystal layer.

The liquid crystal display may further include a light blocking layer between the first color conversion layer and the second color conversion layer and between one of the first color conversion layer and the second color conversion layer, and the transmitting layer.

The liquid crystal display may further include a light blocking member positioned between the thin film transistor and the liquid crystal layer.

The liquid crystal display may further include a first electrode connected to the thin film transistor.

The liquid crystal display may further include a light blocking member between the first electrode and the liquid crystal layer.

The liquid crystal display may further include a light blocking member between the thin film transistor and the liquid crystal layer.

The liquid crystal display may further include a second electrode between the second substrate and the liquid crystal layer.

The liquid crystal display may further include a second polarization layer positioned at a surface of the second substrate in which the second electrode is not positioned.

The liquid crystal display may further include a light unit adjacent the second polarization layer.

Light incident from the light unit may sequentially pass through the second substrate, the liquid crystal layer, and the first substrate to be emitted.

The liquid crystal display may further include a first color filter positioned between the first color conversion layer and the first substrate and a second color filter positioned between the second color conversion layer and the first substrate.

The first color conversion layer may be a red color conversion layer, the first color filter may be a red color filter, the second color conversion layer may be a green color conversion layer, and the second color filter may be a green color filter.

The liquid crystal display may be bent to have a curvature.

A manufacturing method for a liquid crystal display according to an exemplary embodiment includes: forming a first color conversion layer, a second color conversion layer, and a transmitting layer on a first substrate; forming a planarization layer on the first color conversion layer, the second color conversion layer, and the transmitting layer; forming a first polarization layer on the planarization layer; forming a thin film transistor on the first polarization layer; and forming a first electrode connected to the thin film transistor.

The manufacturing method may further include forming a second electrode at one surface of the second substrate, and forming a second polarization layer at the other surface of the second substrate.

Before forming the first color conversion layer, the second color conversion layer, and the transmitting layer, the manufacturing method may further include forming a light blocking layer positioned between the first color conversion layer and the second color conversion layer and between one of the first color conversion layer and the second color conversion layer, and the transmitting layer.

The first color conversion layer may be a red color conversion layer, and the second color conversion layer may be a green color conversion layer.

The manufacturing method may further include forming a light blocking member on the first electrode.

The manufacturing method may further include forming a light blocking member on the thin film transistor between forming the thin film transistor and forming the first electrode.

The manufacturing method may further include forming a polarization insulating layer on the first polarization layer between forming the first polarization layer and forming the thin film transistor.

According to exemplary embodiments, even if the liquid crystal display including the color conversion layer is bent, the transmittance reduction may not be generated.

BRIEF DESCRIPTION OF THE DRAWINGS

Features will become apparent to those of skill in the art by describing in detail exemplary embodiments with reference to the attached drawings in which.

DETAILED DESCRIPTION OF THE EMBODIMENTS

Figure 1:
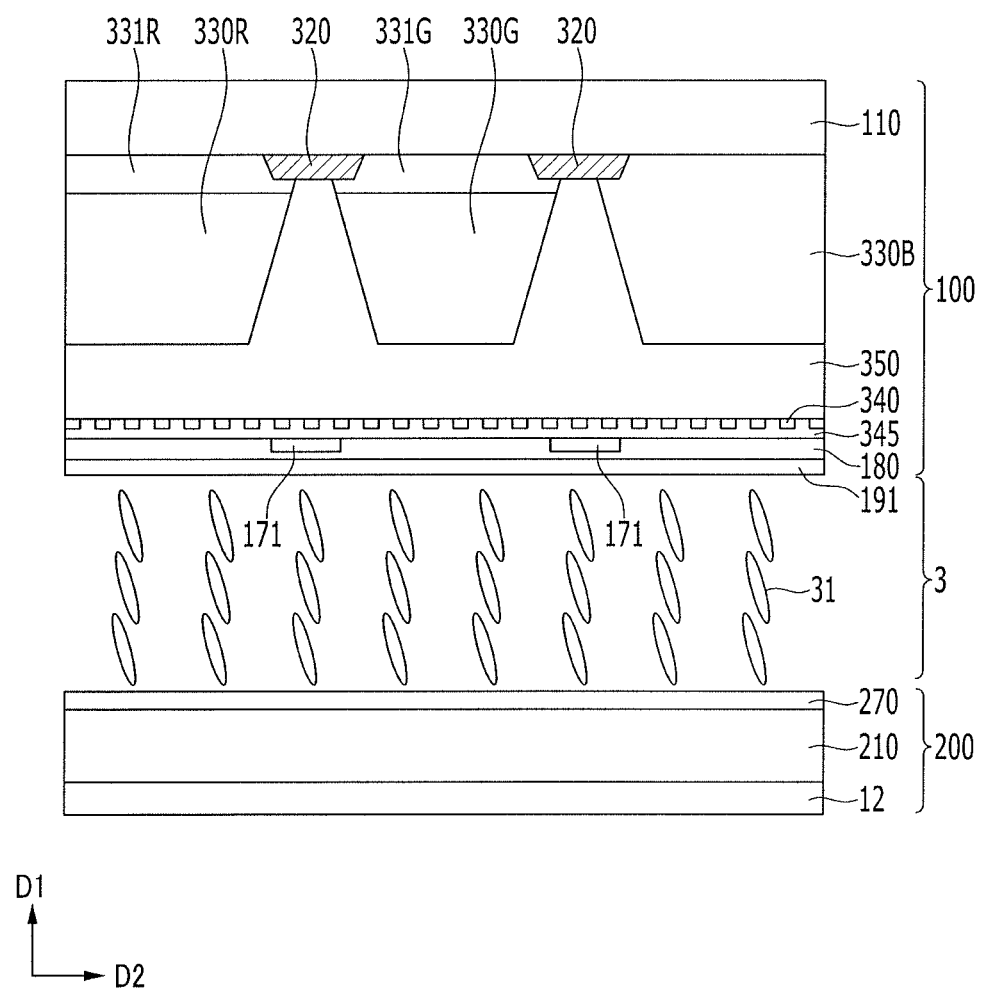
FIG. 1 illustrates a cross-sectional view schematically showing a liquid crystal display according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Further, since sizes and thicknesses of constituent members shown in the accompanying drawings are arbitrarily given for better understanding and ease of description, embodiments are not limited thereto. In the drawings, the thickness of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

The phrase "on a plane" means viewing the object portion from the top, and the phrase "on a cross-section" means viewing a cross-section of which the object portion is vertically cut from the side.

Next, a liquid crystal display according to an exemplary embodiment will be described with reference to FIG. 1. FIG. 1 is a cross-sectional view schematically showing a liquid crystal display according to an exemplary embodiment.

Referring to FIG. 1, the liquid crystal display according to an exemplary embodiment includes a first display panel 100, a second display panel 200 overlapping the first display panel 100, e.g., facing and spaced apart from the first display panel 100 along a first direction, and a liquid crystal layer 3 positioned between the first display panel 100 and the second display panel 200.

The first display panel 100 includes a first substrate 110, color filters 331R and 331G, color conversion layers 330R and 330G, a transmitting layer 330B, a planarization layer 350, a first polarization layer 340, a polarization insulating layer 345, a data line 171, a passivation layer 180, and a first electrode 191. A plurality of color conversion layers 330R and 330G and a plurality of transmitting layers 330B are on a first surface of the first substrate 110, e.g., a surface facing the substrate 200. The color conversion layers 330R and 330G may include a red color conversion layer 330R and a green color conversion layer 330G. The transmitting layer 330B may output light that is incident thereto without separately converting color, e.g., blue light may be incident thereto and output therefrom. Sidewalls of the color conversion layers 330R and 330G and a plurality of transmitting layers 330B may be sloped, e.g., a width along the second direction D2 of these layers may increase along the first direction D1 towards the first substrate 110.

FIG. 1 shows the red color conversion layer 330R and the green color conversion layer 330G, however the positions of the red color conversion layer 330R and the green color conversion layer 330G are not limited to the sequence shown in FIG. 1. That is, the position of the red color conversion layer 330R, the green color conversion layer 330G, and the transmitting layer 330B may be changed. In the present specification, the red color conversion layer 330R is described as a first color conversion layer, and the green color conversion layer 330G is described as a second color conversion layer, however is not limited thereto.

A light blocking layer 320 is between, e.g., along a second direction D2, the red color conversion layer 330R and the green color conversion layer 330G, and between the green color conversion layer 330G and the transmitting layer 330B. The light blocking layer 320 may be on the first surface of the substrate 110 and may partially overlap the red color conversion layer 330R, the green color conversion layer 330G, and the transmitting layer 330B along the first direction D1. The blocking layer 320 may serve to prevent color mixture from being generated between the color conversion layers adjacent to each other or between the color conversion layer and the transmitting layer 330B among the red color conversion layer 330R, the green color conversion layer 330G, and the transmitting layer 330B.

The red color filter 331R may be positioned between the first substrate 110 and the red color conversion layer 330R. The green color filter 331G may be positioned between the first substrate 110 and the green color conversion layer 330G. The red color filter 331R and the green color filter 331G may increase color purity of the light passing through each color conversion layer 330R and 330G. However, the red color filter 331R and the green color filter 331G may be omitted. When omitted, the red color filter 331R and the green color filter 331G may occupy the space thereof illustrated in FIG. 1.

The planarization layer 350 may be between the color conversion layers 330R and 330G and the polarization insulating layer 345 and between the transmitting layer 330B and the polarization insulating layer 345. The planarization layer 350 may fill an empty space between the red color conversion layer 330R and the green color conversion layer 330G and between the green color conversion layer 330G and the transmitting layer 330B. The planarization layer 350 may include an organic material.

The planarization layer 350 compensates for a step between the region where the red color conversion layer 330R, the green color conversion layer 330G, and the transmitting layer 330B are positioned and the region where they are not positioned, thereby providing a flat surface for the first polarization layer 340. The first polarization layer 340 may be between the planarization layer 350 and the passivation layer 180. The first polarization layer 340 may polarize the light passing through the liquid crystal layer 3 in a predetermined direction to be output to the color conversion layers 330R and 330G and the transmitting layer 330B.

The first polarization layer 340 may include a plurality of minute lines, e.g., metal lines, arranged with a predetermined interval. Embodiments are not limited thereto, e.g., the first polarization layer 340 may be different types of polarizers, e.g., a coating.

The polarization insulating layer 345 may be on a surface of the planarization layer 350 to cover the first polarization layer 340. The polarization insulating layer 345 compensates for a step of the first polarization layer 340 when the first polarization layer includes the plurality of minute lines, thereby providing the flat surface. In particular, the polarization insulating layer 345 may cover top surfaces and sidewalls of the plurality of minute lines when used as the first polarization layer 340.

A thin film transistor including the data line 171 may be on the flat surface of the polarization insulating layer 345. Although not shown in detail in FIG. 1, to configure the thin film transistor as a switching element, a gate electrode, a semiconductor layer, a source electrode, a drain electrode, and the like may be between the polarization insulating layer 345 and the passivation layer 180, along with the data line 171. Also, an insulating layer to insulate the gate electrode, and the source electrode and drain electrode, may be between the data line 171 and the polarization insulating layer 345.

The passivation layer 180 is between the data line 171 and the liquid crystal layer 3. The first electrode 191 is between the passivation layer 180 and the liquid crystal layer 3. The first electrode 191 is electrically connected to the thin film transistor, thereby receiving a voltage. The first electrode 191 may be a pixel electrode. A light blocking member may be on the first passivation layer 181, as discussed below in FIGS. 2 and 3. That is, in the liquid crystal display according to the present exemplary embodiment, the light blocking layer 320 and the light blocking member may be on the same substrate. Further, in the liquid crystal display according to the present exemplary embodiment, the light blocking layer 320 and the thin film transistor including the data line 171 may be on the same substrate. Accordingly, a transmittance reduction due to a misalignment may be prevented, and this will be described later in detail.

Next, the second display panel 200 will be described. A second polarization layer 12 is on a first surface of the second substrate 210, e.g., a surface that does not face the first substrate 110, and a second electrode 270 is on a second surface, opposite the first surface, of the second substrate 210, e.g., a surface that faces the first substrate 110. The second electrode 270 may be a common electrode.

The second electrode 270 is between the second substrate 210 and the liquid crystal layer 3. The first electrode 191 on the first display panel 100 and the second electrode 270 on the second display panel 200 form an electric field, thereby aligning liquid crystal molecules 31 of the liquid crystal layer 3.

An alignment layer may be between the liquid crystal layer 3 and the pixel electrode 191, and between the liquid crystal layer 3 and the common electrode 270. A light unit may be adjacent to the second polarization layer 12 of the second display panel 200. Light from the light unit is incident to the color conversion layer 330R and 330G through the second polarization layer 12, the liquid crystal layer 3, and the first polarization layer 340. The light unit may include at least one light emitting diode (LED), e.g., a blue light emitting diode (LED).

For the liquid crystal display according to an exemplary embodiment, the first display panel 100 includes the color conversion layers 330R and 330G, the first polarization layer 340, and the thin film transistor, and the light is incident to the second display panel 200, passes through the liquid crystal layer 3, and is emitted through the color conversion layers 330R and 330G of the first display panel 100.

Accordingly, in the liquid crystal display according to the present exemplary embodiment, the color conversion layers 330R and 330G are closest to the user, and the thin film transistor and the first electrode 191 are positioned on the same substrate. Accordingly, since the light blocking layer 320 between the color conversion layers 330R and 330G and the light blocking member of the thin film transistor are on the same substrate, when the liquid crystal display is bent into a curved type, a transmittance reduction due to the misalignment is not generated.

Figure 2:
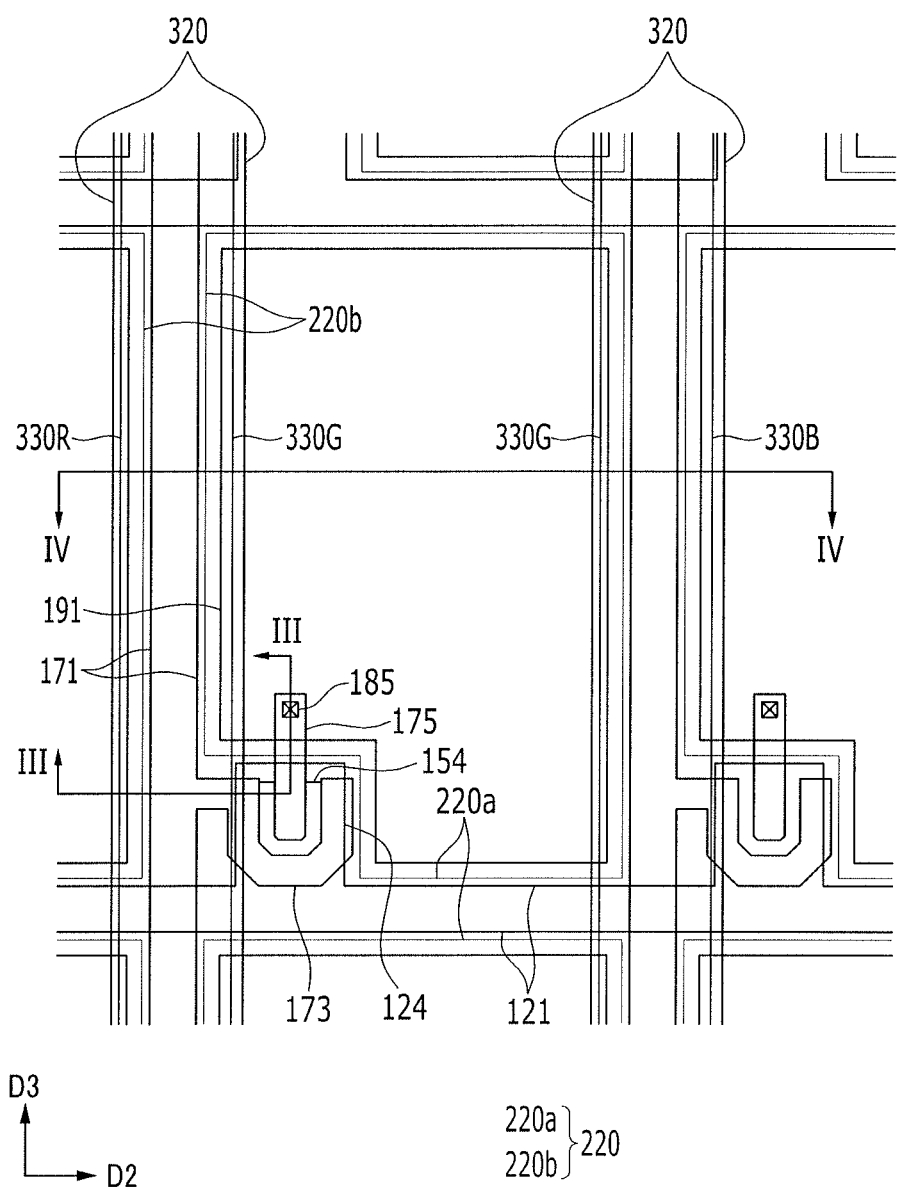
FIG. 2 illustrates a layout view of a liquid crystal display according to an exemplary embodiment.
Figure 3:
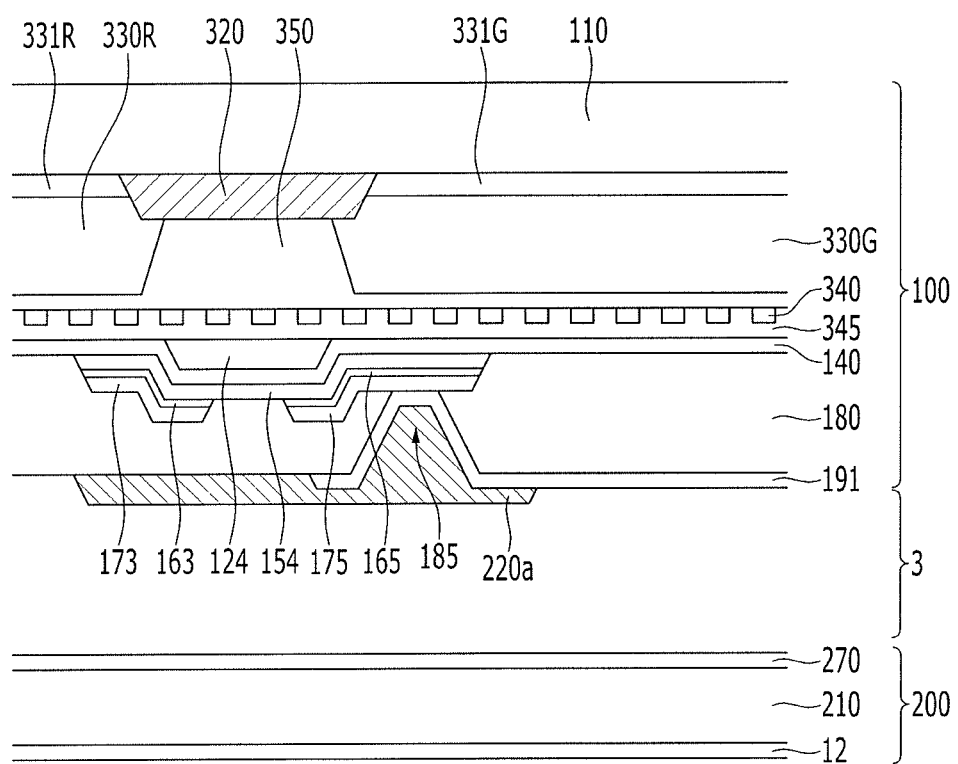
FIG. 3 illustrates a cross-sectional view of the liquid crystal display shown in FIG. 2 taken along a line III-III.
Figure 4:
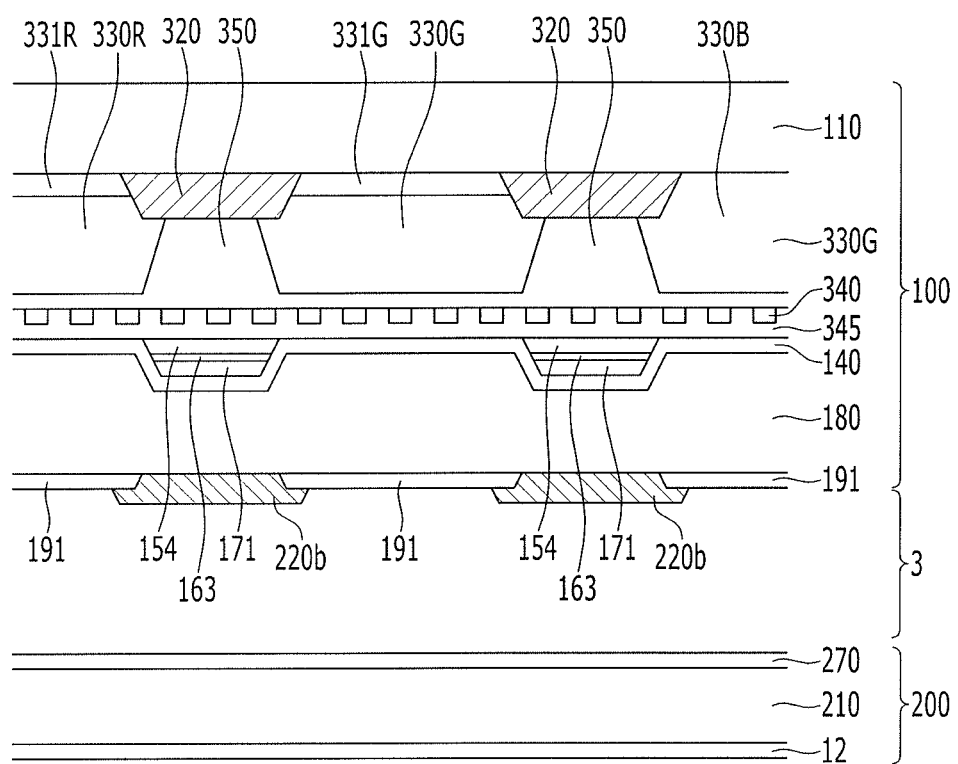
FIG. 4 illustrates a cross-sectional view of the liquid crystal display shown in FIG. 2 taken along a line IV-IV.

Next, the liquid crystal display according to an exemplary embodiment will be described in detail with reference to accompanying drawings. FIG. 2 is a layout view of a liquid crystal display according to an exemplary embodiment. FIG. 3 is a cross-sectional view of the liquid crystal display shown in FIG. 2 taken along a line III-III. FIG. 4 is a cross-sectional view of the liquid crystal display shown in FIG. 2 taken along a line IV-IV. FIG. 2 to FIG. 4 show the detailed structure in which the liquid crystal display according to an exemplary embodiment of FIG. 1 includes the thin film transistor.

Referring to FIG. 2 to FIG. 4, the liquid crystal display according to an exemplary embodiment includes the first display panel 100, the second display panel 200 overlapping thereto, and the liquid crystal layer 3 between the first display panel 100 and the second display panel 200.

As shown in FIG. 3 and FIG. 4, the first display panel 100 is at an upper side of the display device and the second display panel 200 is located at a lower side of the display device. In the present specification, for convenience, in the liquid crystal display, a side at which the user views a screen is referred to as the upper side, and a side at which the light unit is formed is referred to as the lower side. Thus, the light unit may be positioned to be close to the second display panel 200, and the user recognizes the image at the side of the first display panel 100.

First, the first display panel 100 will be described. The first substrate 110 may includes transparent glass or plastic.

The first substrate 110 includes a plurality of light blocking layers 320. Each light blocking layer 320 may extend along a third direction D3, and the red color conversion layer 330R, the green color conversion layer 330G, and the transmitting layer 330B are at the same layer along the third direction at the region between the adjacent light blocking layers 320. Here, the third direction D3 may be a direction that the data line 171 of FIG. 2 extends.

The red color conversion layer 330R may include a quantum dot converting incident blue light into red light. The green color conversion layer 330G may include a quantum dot converting incident blue light into green light.

In this case, the quantum dot may be selected from a Group II-VI compound, a Group III-V compound, a Group IV-VI compound, a Group IV element, a Group IV compound, and a combination thereof.

The Group II-VI compound may be a two-element compound, e.g., CdSe, CdTe, ZnS, ZnSe, ZnTe, ZnO, HgS, HgSe, HgTe, MgSe, MgS, and a mixture thereof; a three-element compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a four-element compound, e.g., HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. The Group III-V compound may be a two-element, e.g., GaN, GaP, GaAs, GaSb, AlN, AlP, AlAs, AlSb, InN, InP, InAs, InSb, and a mixture thereof; a three-element compound, e.g., GaNP, GaNAs, GaNSb, GaPAs, GaPSb, AlNP, AlNAs, AlNSb, AlPAs, AlPSb, InNP, InNAs, InNSb, InPAs, InPSb, and a mixture thereof; and a four-element compound, e.g., GaAlNAs, GaAlNSb, GaAlPAs, GaAlPSb, GaInNP GaInNAs, GaInNSb, GaInPAs, GaInPSb, GaAlNP, InAlNP, InAlNAs, InAlNSb, InAlPAs, InAlPSb, and a mixture thereof. The Group IV-VI compound may be a two-element compound, e.g., SnS, SnSe, SnTe, PbS, PbSe, PbTe, and a mixture thereof; a three-element compound, e.g., SnSeS, SnSeTe, SnSTe, PbSeS, PbSeTe, PbSTe, SnPbS. SnPbSe. SnPbTe, and a mixture thereof; and a four-element compound, e.g., SnPbSSe, SnPbSeTe, SnPbSTe, and a mixture thereof. The Group IV element may be, e.g., Si, Ge, and a mixture thereof. The Group IV compound may be a two-element compound, e.g., selected from SiC, SiGe, and a mixture thereof.

In this case, the two-element compound, the three-element compound, or the four-element compound may exist in particles at a uniform concentration, or in the same particle while being divided to have partially different concentration distributions. Alternatively, they may have a core/shell structure where one quantum dot encloses another quantum dot. An interface between the core and the shell may have a concentration gradient such that a concentration of an element existing in the shell gradually decreases closer to a center of the interface.

The quantum dot is not specifically limited to have shapes that are generally used in the technical field related to the present disclosure, and more specifically, may have a shape such as a nanoparticle having a spherical shape, a pyramid shape, a multi-arm shape, or a cubic shape, or may be a nanotube, a nanowire, a nanofiber, a planar nanoparticle, etc.

The transmission layer 330B may include a resin that transmits blue light incident thereon. The transmission layer 330B positioned in a region for emitting blue light emits the incident blue light as is without a separate phosphor or quantum dot.

The red color filter 331R may be between the first substrate 110 and the red color conversion layer 330R. The red color filter 331R removes the light of a wavelength out of the red region among the light passing through the red color conversion layer 330R, thereby increasing purity of the red light. Likewise, the green color filter 331G between the first substrate 110 and the green color conversion layer 330G removes the light of a wavelength out of the green region, thereby increasing purity of the green light.

The red color filter 331R and the green color filter 331G may increase the color purity of the light passing through each color conversion layer 330R and 330G. However, the red color filter 331R and the green color filter 331G may be omitted.

The planarization layer 350 is between the color conversion layers 330R and 330G and the polarization insulating layer 345 and between the transmitting layer 330B and the polarization insulating layer 345. The planarization layer 350 may fill the empty space between the red color conversion layer 330R and the green color conversion layer 330G, and between the green color conversion layer 330G and the transmitting layer 330B. The planarization layer 350 may include an organic material.

The planarization layer 350 compensates for the step between the region where the red color conversion layer 330R, the green color conversion layer 330G, and the transmitting layer 330B are positioned and the region where they are not positioned, thereby providing the flat surface for the first polarization layer 340.

The first polarization layer 340 is between the planarization layer 350 and the passivation layer 180. The first polarization layer 340 may include the plurality of minute lines. e.g., metal lines, arranged at the predetermined interval. The first polarization layer 340 is not limited thereto, may be formed of other polarization types, e.g., a polarization film.

The first polarization layer 340 may polarize the light passing through the liquid crystal layer 3 in a predetermined direction to be output to the color conversion layer 330R and 330G and the transmitting layer 330B.

The polarization insulating layer 345 is on a first surface of the planarization layer 350 to cover the first polarization layer 340. The polarization insulating layer 345 compensates for the step when the first polarization layer 340 includes the plurality of minute lines, thereby providing the flat surface.

A gate conductor including a gate line 121 and a gate electrode 124 are on the flat surface of the polarization insulating layer 345. The gate line 121 extends in a second direction D2 crossing the third direction D3. The gate conductor may include various metals or conductors, or may have a multilayer structure.

A gate insulating layer 140 is between the gate conductor and the liquid crystal layer 3. The gate insulating layer 140 may include an inorganic insulating material. A semiconductor layer 154 may be on a first surface of the gate insulating layer 140, e.g., a surface further from the first substrate 110.

The data line 171 is between the semiconductor layer 154 and the liquid crystal layer 3 and extends in the third direction D3, thereby crossing the gate line 121. A source electrode 173 may extend from the data line 171 and may overlap the gate electrode 124. A drain electrode 175 is separated from the data line 171, as shown in FIG. 2, and may have a bar shape extending toward the upper side from a center of the source electrode 173.

A part of the semiconductor layer 154 may not overlap the data line 171 and the drain electrode 175 at the region between the source electrode 173 and the drain electrode 175. The semiconductor layer 154 may have a substantially same plane shape as the data line 171 and the drain electrode 175 except for the non-overlapping part.

One gate electrode 124, one source electrode 173, and one drain electrode 175 form one thin film transistor along with the semiconductor layer 154. A channel of the thin film transistor is the semiconductor layer 154 region between the source electrode 173 and the drain electrode 175.

The passivation layer 180 is between the source electrode 173 and drain electrode 175, and the liquid crystal layer 3. The passivation layer 180 may include an inorganic insulating material, e.g., a silicon nitride or a silicon oxide, an organic insulating material, or a low dielectric insulating material.

The passivation layer 180 has a contact hole 185 overlapping a part of the drain electrode 175. The first electrode 191 is between the passivation layer 180 and the liquid crystal layer 3. The first electrode 191 is physically and electrically connected to the drain electrode 175 through the contact hole 185, and receives a data voltage from the drain electrode 175. The first electrode 191 may be the pixel electrode.

A light blocking member 220 is between the passivation layer 180 and the liquid crystal layer 3 and between the first electrode 191 and the liquid crystal layer 3. As shown in FIG. 2, the light blocking member may include a transverse light blocking member 220a extending in a direction parallel to the gate line 121, e.g., along the second direction, and a longitudinal light blocking member 220b extending in a direction parallel to the data line 171, e.g., the third direction D3. That is, the light blocking member may have a lattice shape. In the present specification, the light blocking member is referred to as including the transverse light blocking member 220a and the longitudinal light blocking member 220b.

The transverse light blocking member 220a may block the light incident from the light unit from reaching the semiconductor layer 154, e.g., may overlap the channel region of the semiconductor layer 154 or may completely overlap the semiconductor layer along the first direction. As may be seen in FIG. 3, the transverse light blocking member 220a may be on a portion of the first electrode 191 and may fill the contact hole 185 such that a surface of the transverse light blocking member 220a facing the liquid crystal layer 3 may be planar, with a first sidewall thereof that is not on the first electrode 191 being thicker than a second sidewall thereof that is on the first electrode 191.

The longitudinal light blocking member 220b shown in FIG. 4 may extend between adjacent first electrodes 191, may partially overlap the first electrodes 191 and may completely overlap the semiconductor layer 154 along the first direction D1. In the present exemplary embodiment, the user recognizes the screen in the first substrate 110 direction. Referring to FIG. 4, since the longitudinal light blocking member 220b overlaps, e.g., along the first direction, the light blocking layer 320 adjacent to the first substrate 110, even if the longitudinal light blocking member 220b is omitted, the light blocking layer 320 may perform the function of the longitudinal light blocking member 220b. In this case, the light blocking member does not have the lattice shape, but the light blocking member may be a stripe shape of which only the transverse light blocking member 220a remains.

Next, the second display panel 200 will be described. The second polarization layer 12 is on the first surface of the second substrate 210, and the second electrode 270 is on the second surface. The second electrode 270 may be the common electrode.

The second electrode 270 is between the second substrate 210 and the liquid crystal layer 3. The first electrode 191 on the first display panel 100 and the second electrode 270 on the second display panel 200 form an electric field, thereby aligning the liquid crystal molecules 31 of the liquid crystal layer 3.

As above-described, in the liquid crystal display according to the present exemplary embodiment, since the light from the light unit is incident on the color conversion layers 330R and 330G after passing through the second polarization layer 12, the liquid crystal layer 3, and the first polarization layer 340, the light does not pass through the first substrate 110 before being incident to the color conversion layers 330R and 330G, accordingly, the loss due to the light path may be minimized.

Also, in the liquid crystal display according to the present exemplary embodiment, since the color conversion layers 330R and 330G and the thin film transistor are on in the first display panel 100, a number substrates used in the liquid crystal display may be reduced, the manufacturing process is simplified, and the thickness may be reduced.

That is, in the case of the liquid crystal display in the general color conversion layer, a color conversion panel including the color conversion layer is separately positioned on the display panel. However, in the liquid crystal display according to the present exemplary embodiment, as the color conversion layers 330R and 330G, the thin film transistor, and the first electrode 191 are on the first display panel 100, the number of substrates may be reduced, and the thickness of the liquid crystal display may be thin.

Also, in the liquid crystal display according to the present exemplary embodiment, as the color conversion layers 330R and 330G and the thin film transistor are positioned on the same substrate, the light blocking layer 320 between the color conversion layers 330R and 330G and the light blocking member 220 of the thin film transistor are positioned on the same substrate, and accordingly, when bending the liquid crystal display of the curved type, the transmittance reduction is not generated by the misalignment of the light blocking layer 320 and the light blocking member 220.

As shown in FIG. 1 to FIG. 4, in the liquid crystal display according to an exemplary embodiment, the light blocking layer 320 is between the plurality of color conversion layers 330R and 330G and the transmitting layer 330B, and the light blocking member is between the first electrode 191 and the liquid crystal layer 3. The light blocking member includes a transverse light blocking member 220a and a longitudinal light blocking member 220b, and the light blocking layer 320 and the longitudinal light blocking member 220b may extend in the first direction while being overlapped in the direction vertical to the first substrate 110.

If the color conversion layer is positioned in the different display panel from the thin film transistor, when bending the liquid crystal display, the misalignment of the light blocking layer 320 and the longitudinal light blocking member 220b may be generated. That is, in the unbent state, the light blocking layer 320 and the longitudinal light blocking member 220b are overlapped in the direction perpendicular to the first substrate, however, when bending the liquid crystal display, by the curvature difference of the first substrate 110 and the second substrate 210 respectively included in the first and second display panels 100 and 200, the light blocking layer 320 and the longitudinal light blocking member 220b that are positioned at the different display panels from each other do not overlap each other. In this case, while the light blocking layer 320 is positioned in the pixel area, the light blocking layer 320 is recognized as black, which becomes a cause of reducing the aperture ratio and the transmittance of the liquid crystal display.

However, in the liquid crystal display according to the present exemplary embodiment, as the color conversion layers 330R and 330G and the thin film transistor are positioned in the same substrate and the light blocking layer 320 and the light blocking member are positioned in the substrate, even if the liquid crystal display is bent as the curved type, the misalignment of the light blocking layer 320 and the light blocking member is not generated.

Also, in the liquid crystal display according to the present exemplary embodiment, as the color conversion layers 330R and 330G are close to the first substrate 110, the color conversion layers 330R and 330G are closer to the user compared with other parts of the liquid crystal display. In this structure, the light passing through the color conversion layer is directly recognized by the user such that the efficiency may be increased and the color purity may be increased.

Figure 5:
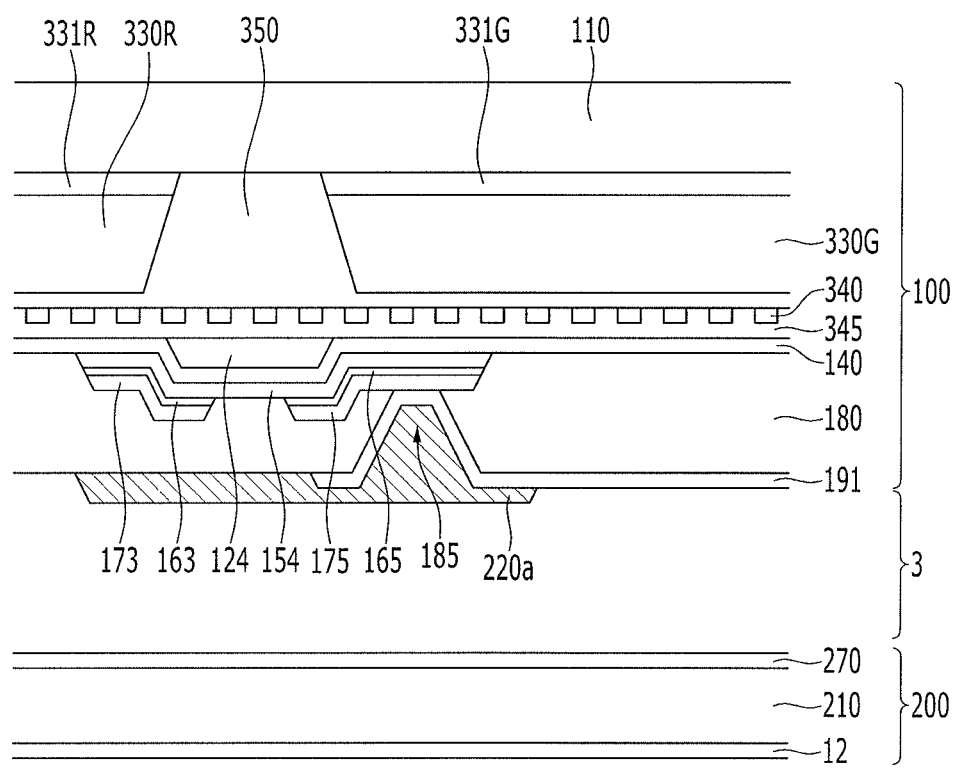
FIG. 5 illustrates a view of a liquid crystal display according to an exemplary variation on the same cross-section as that of FIG. 3.
Figure 6:
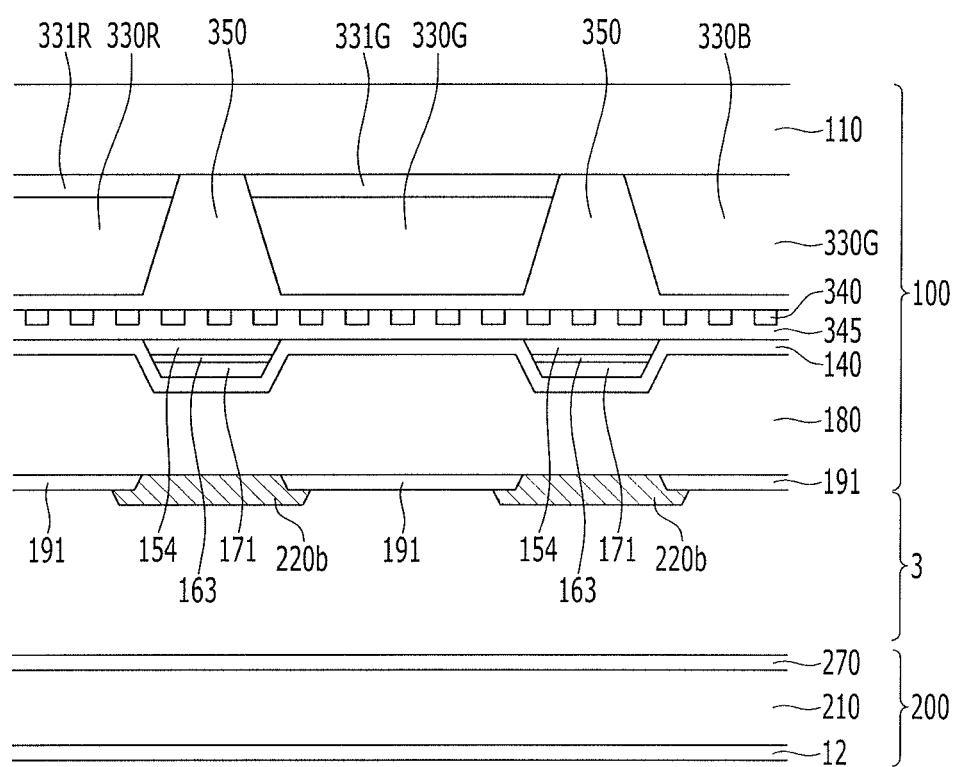
FIG. 6 illustrates a view of a liquid crystal display according to an exemplary variation on the same cross-section as that of FIG. 4.

Next, the liquid crystal display according to an exemplary variation of the above-described exemplary embodiment will be described with reference to FIG. 5 and FIG. 6. FIG. 5 is a view of a liquid crystal display according to an exemplary variation on the same cross-section as that of FIG. 3. FIG. 6 is a view of a liquid crystal display according to an exemplary variation on the same cross-section as that of FIG. 4.

The liquid crystal display according to the exemplary embodiment described in FIG. 5 and FIG. 6 is similar to most of the liquid crystal display according to FIG. 1 to FIG. 4. The detailed description for the same constituent elements will not be repeated.

Referring to FIG. 5 and FIG. 6, in the liquid crystal display according to the present exemplary embodiment, the light blocking layer is not between the adjacent color conversion layers 330R and 330G and between the color conversion layer 330G and the transmitting layer 330B. The longitudinal light blocking member 220b may prevent the color mixture between the adjacent color conversion layers instead of the light blocking layer. The longitudinal light blocking member 220b according to the present embodiment may be wider along the second direction than the longitudinal light blocking member 220b in the liquid crystal display according to the exemplary embodiment described in FIG. 2 to FIG. 4 to prevent color mixture.

Accordingly, for the liquid crystal display according to the exemplary embodiment of FIG. 5 and FIG. 6, while having all effects of the liquid crystal display according to the exemplary embodiment of FIG. 1 to FIG. 4, manufacturing of the light blocking layer may be additionally omitted such that the process may be simplified and a cost may be reduced.

Figure 7:
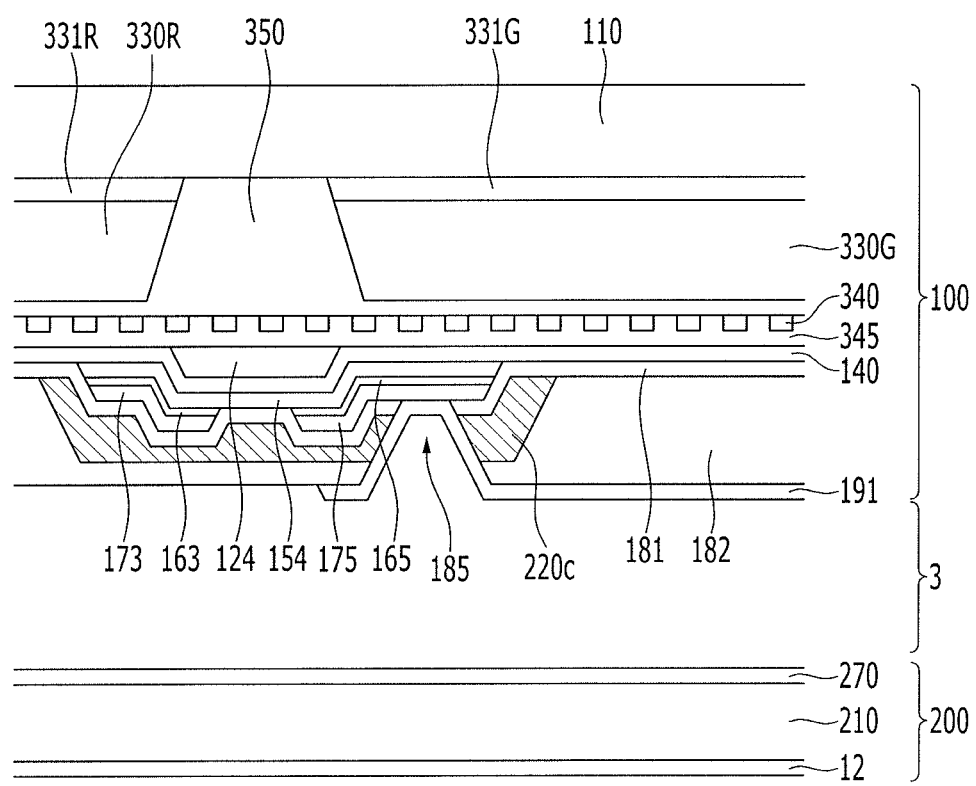
FIG. 7 illustrates a view of a liquid crystal display according to an exemplary variation on the same cross-section as that of FIG. 5.
Figure 8:
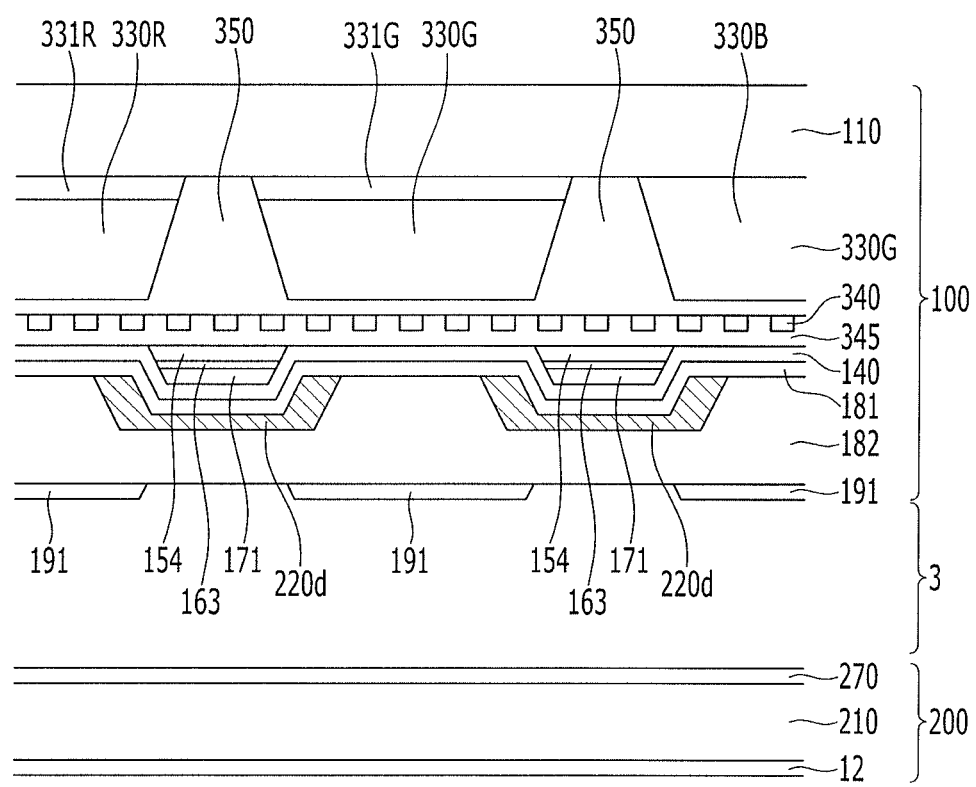
FIG. 8 illustrates a view of a liquid crystal display according to an exemplary variation on the same cross-section as that of FIG. 6.

Next, the liquid crystal display according to another exemplary embodiment will be described. FIG. 7 is a view of a liquid crystal display according to an exemplary variation on the same cross-section as that of FIG. 5. FIG. 8 is a view of a liquid crystal display according to an exemplary variation on the same cross-section as that of FIG. 6.

Referring to FIG. 7 and FIG. 8, the liquid crystal display according to the present exemplary embodiment is similar to most of the liquid crystal display according to FIG. 5 and FIG. 6. The detailed description for the same constituent elements is not repeated.

Referring to FIG. 7 and FIG. 8, in the liquid crystal display according to the present exemplary embodiment, the light blocking member includes a longitudinal light blocking member 220d and the transverse light blocking member 220c is between the thin film transistor including the source electrode 173, the drain electrode 175, and the semiconductor layer 154, and the first electrode 191. Again, the transverse light blocking member 220c and the longitudinal light blocking member 220d may overlap the semiconductor layer 154 along the first direction.

In detail, the first passivation layer 181 is between the thin film transistor including the source electrode 173, the drain electrode 175, and the semiconductor layer 154, and the first electrode 191. A second passivation layer 182 is between the first passivation layer 181 and the first electrode 191, and the light blocking member including the longitudinal light blocking member 220d and the transverse light blocking member 220c is between the first passivation layer 181 and the second passivation layer 182. The transverse light blocking member 220c may be discontinuous such that the contact hole is provided therethrough to connect the first electrode 191 to the drain electrode 175.

The liquid crystal display according to the present exemplary embodiment is the same as the liquid crystal display according to the exemplary embodiment of FIG. 5 and FIG. 6, except that the light blocking member is positioned between the first electrode 191 and the thin film transistor, not between the first electrode 191 and the liquid crystal layer 3. Accordingly, while the liquid crystal display according to the present exemplary embodiment has all effects of the liquid crystal display according to the exemplary embodiment of FIG. 5 and FIG. 6, the light blocking member is additionally in contact with the liquid crystal layer 3 such that contamination of the liquid crystal layer 3 may be prevented.

Figure 9:
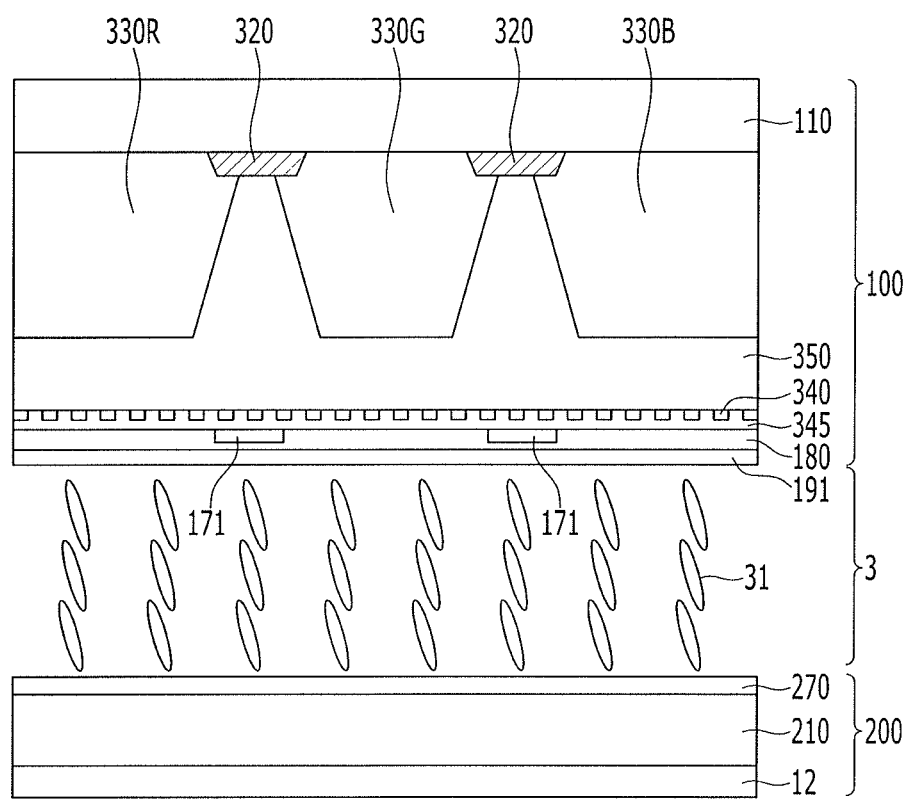
FIG. 9 illustrates a cross-sectional view of a liquid crystal display according to an exemplary variation of FIG. 1.

Next, the liquid crystal display according to an exemplary variation of FIG. 1 will be described with reference to FIG. 9. Comparing FIG. 1 and FIG. 9, FIG. 9 is the same as FIG. 1 except that it does not include the red color filter 331R and the green color filter 331G. Accordingly, as the embodiment of FIG. 9 does not include the red color filter and the green color filter, the manufacturing process may be simplified and the cost may be reduced.

Figure 10:
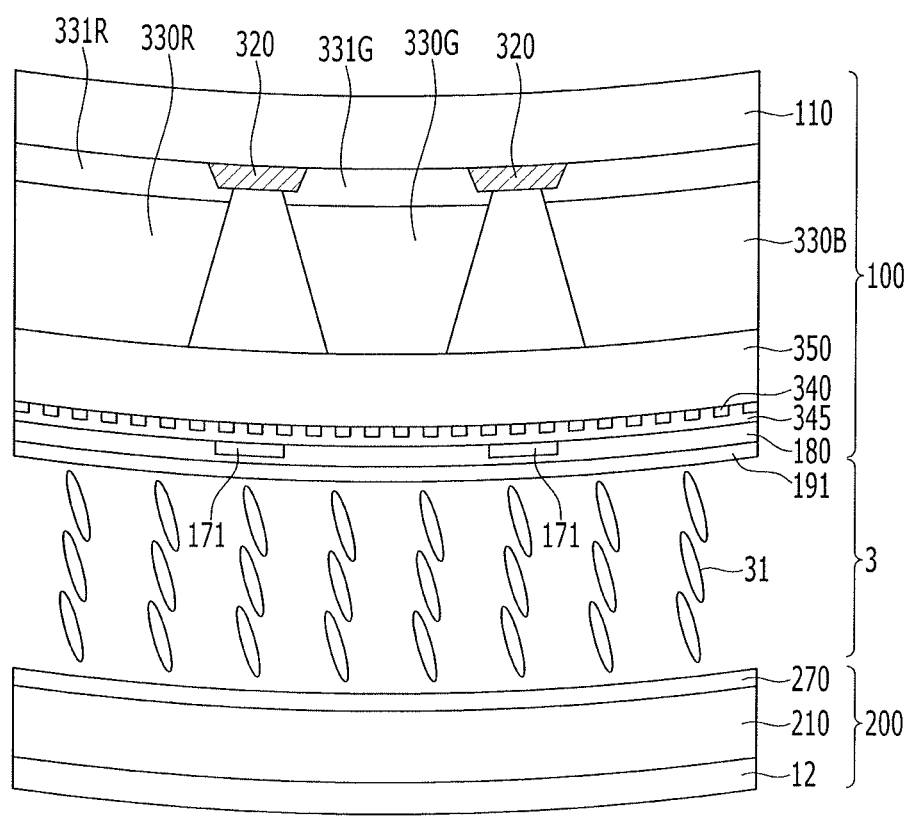
FIG. 10 illustrates a cross-sectional view of a liquid crystal display according to an exemplary variation of FIG. 1.

FIG. 10 shows the liquid crystal display according to the exemplary variation of FIG. 1, and comparing FIG. 1 and FIG. 10, the liquid crystal display of FIG. 10 is the same as FIG. 1 except for being bent with a predetermined curvature. Accordingly, as the liquid crystal display of the FIG. 10 has the curvature, user immersion may increase.

Figure 11A:
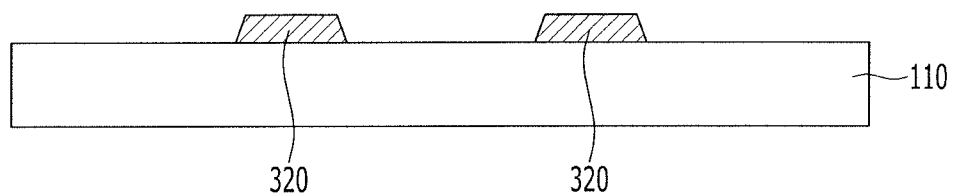
FIG. 11A, FIG. 11B, FIG. 11C, FIG. 11D, FIG. 11E, FIG. 11F, and FIG. 11G illustrate cross-sectional views of stages in a manufacturing process of a first display panel of a liquid crystal display according to an exemplary embodiment.

Next, the manufacturing method of the liquid crystal display according to an exemplary embodiment will be described. FIG. 11A, FIG. 11B, FIG. 11C, FIG. 11D, FIG. 11E, FIG. 11F, and FIG. 11G are cross-sectional views showing stages in a manufacturing process of a first display panel of a liquid crystal display according to an exemplary embodiment. FIG. 12 is a cross-sectional view showing a manufacturing process of a second display panel of a liquid crystal display according to an exemplary embodiment.

First, the manufacturing method of the first display panel will be described. Referring to FIG. 11A, a light blocking layer 320 is formed on the first substrate 110.

Figure 11B:
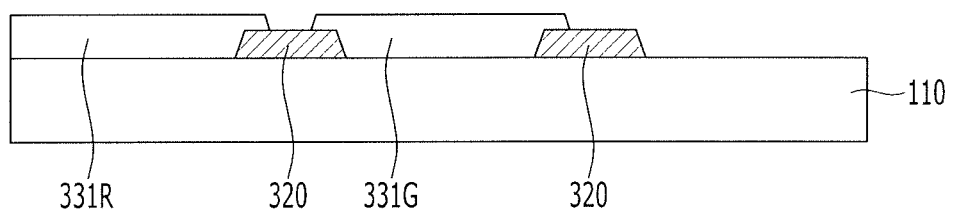
Figure 12:
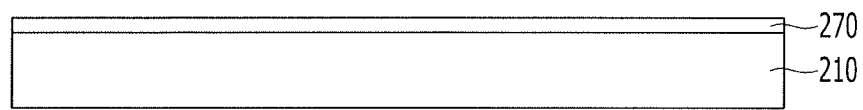
FIG. 12 illustrates a cross-sectional view showing a manufacturing process of a second display panel of a liquid crystal display according to an exemplary embodiment.
Figure 12:
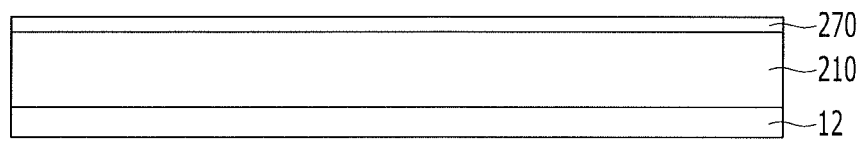

Next, referring to FIG. 11B, a red color filter 331R and a green color filter 331G are formed between the light blocking layers 320 adjacent to each other. However, this stage may be omitted.

Figure 11C:
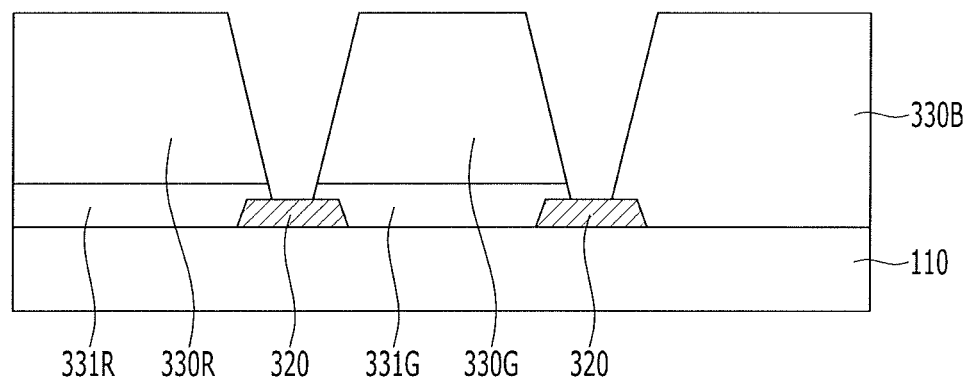

Next, referring to FIG. 11C, a red color conversion layer 330R, a green color conversion layer 330G, and a transmitting layer 330B are respectively formed on the red color filter 331R, and on the green color filter 331G, and on the first substrate 110. The description for the red color conversion layer 330R, the green color conversion layer 330G, and the transmitting layer 330B is the same as above-described.

Figure 11D:
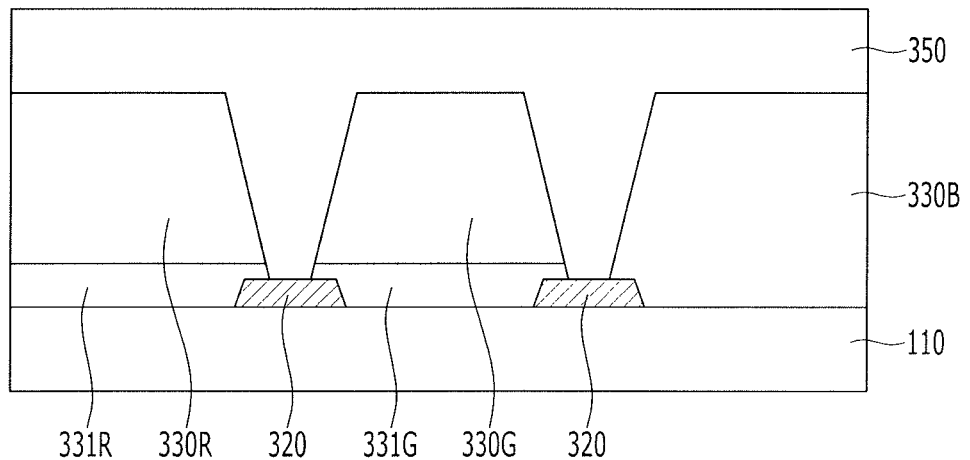

Next, referring to FIG. 11D, a planarization layer 350 is formed on the red color conversion layer 330R, the green color conversion layer 330G, and the transmitting layer 330B. The planarization layer 350 fills the space between the red color conversion layer 330R, the green color conversion layer 330G, and the transmitting layer 330B and provides the flat surface.

Figure 11E:
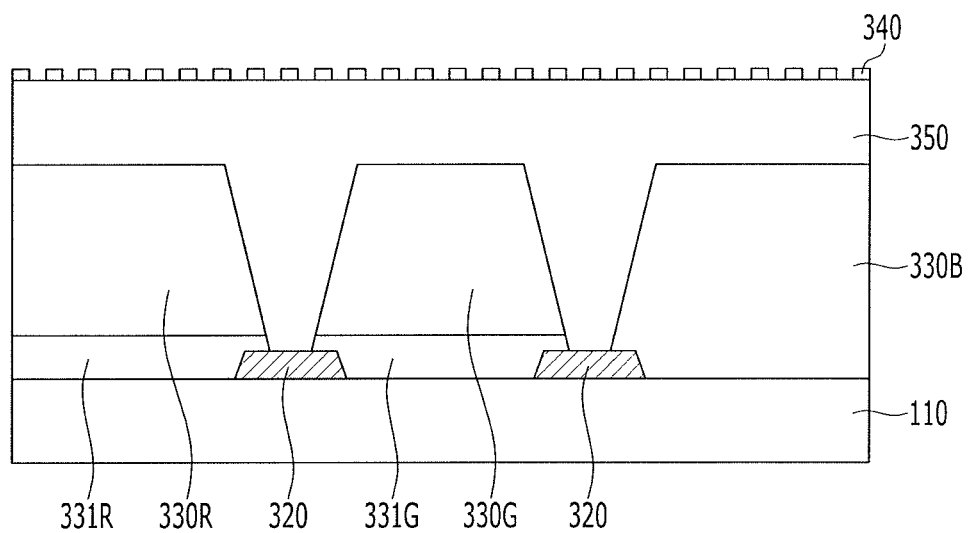

Next, referring to FIG. 11E, a first polarization layer 340 including a plurality of minute lines is formed on the planarization layer 350.

Figure 11F:
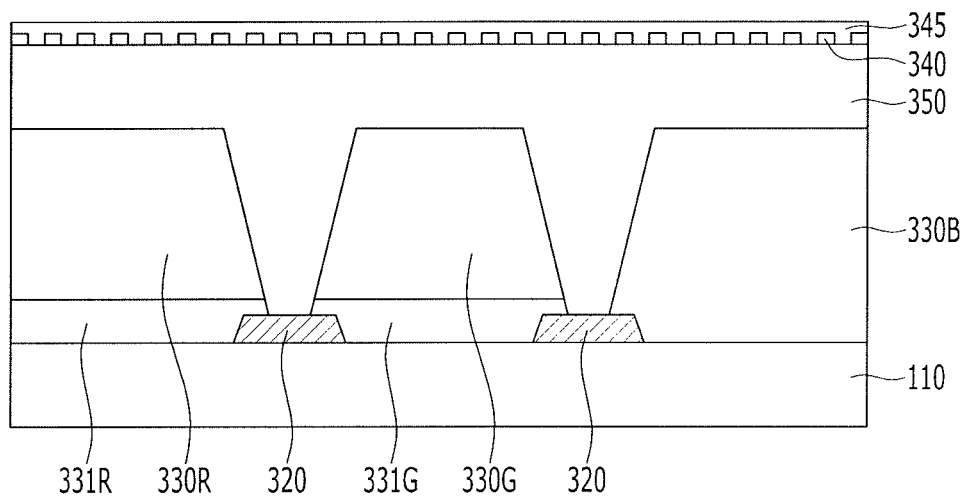

Next, referring to FIG. 11F, a polarization insulating layer 345 is formed on the first polarization layer 340. The polarization insulating layer 345 compensates for the step when the first polarization layer 340 includes the plurality of minute lines, thereby providing the flat surface. Accordingly, the later-formed thin film transistor and the like may be formed without an additional separate substrate. When the height of the plurality of minute lines included in the first polarization layer 340 is not large or a polarization film is used, a structure in which the polarization insulating layer 345 may be omitted.

Figure 11G:
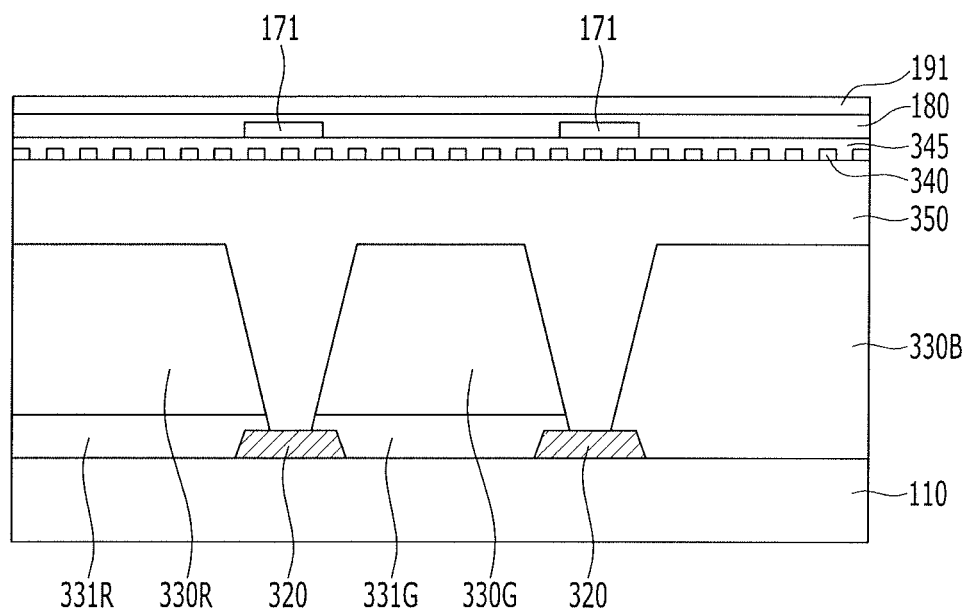

Next, referring to FIG. 11G, a data line 171 and a thin film transistor, a passivation layer 180, and a first electrode 191 are formed on the polarization insulating layer 345. Although not shown, the first electrode 191 may be connected to the drain electrode of the thin film transistor through a contact hole formed in the passivation layer 180.

Although not shown, forming the light blocking member may be further included.

Next, the manufacturing method of the second display panel will be described with reference to FIG. 12.

Referring to FIG. 12 (a), the second electrode 270 is formed on the first surface of the second substrate 210. Next, referring to FIG. 12 (b), the second polarization layer 12 is formed on the second surface of the second substrate 210 on which the second electrode 270 is not formed.

Subsequently, the first display panel manufactured through the process of FIG. 11 and the second display panel manufactured through the process of FIG. 12 are combined, and the liquid crystal layer including a liquid crystal is formed between the first and second display panels to manufacture the liquid crystal display. The liquid crystal layer may be formed before combining the first and second display panels.

By way of summation and review, exemplary embodiments provide a liquid crystal display without a transmittance reduction even if the liquid crystal display including the color conversion layer is bent.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A liquid crystal display, comprising:
a first substrate;
a second substrate facing and spaced from the first substrate;
a liquid crystal layer between the first substrate and the second substrate;
a first color conversion layer, a second color conversion layer, and a transmitting layer between the first substrate and the liquid crystal layer;
a first polarization layer between the first color conversion layer and the liquid crystal layer, between the second color conversion layer and the liquid crystal layer, and between the transmitting layer and the liquid crystal layer;
a thin film transistor between the first polarization layer and the liquid crystal layer;
a second electrode between the second substrate and the liquid crystal layer;
a second polarization layer positioned at a surface of the second substrate in which the second electrode is not positioned; and
a light unit adjacent the second polarization layer,
wherein incident light from the light unit sequentially passes through the second substrate, the liquid crystal layer, and the first substrate to be emitted.

2. The liquid crystal display as claimed in claim 1, further comprising:
a light blocking layer between the first color conversion layer and the second color conversion layer and between one of the first color conversion layer and the second color conversion layer, and the transmitting layer.

3. The liquid crystal display as claimed in claim 2, further comprising
a light blocking member between the thin film transistor and the liquid crystal layer.

4. The liquid crystal display as claimed in claim 1, further comprising
a first electrode connected to the thin film transistor.

5. The liquid crystal display as claimed in claim 4, further comprising
a light blocking member between the first electrode and the liquid crystal layer.

6. The liquid crystal display as claimed in claim 1, further comprising
a light blocking member between the thin film transistor and the liquid crystal layer.

7. The liquid crystal display as claimed in claim 1, further comprising
a first color filter between the first color conversion layer and the first substrate and a second color filter positioned between the second color conversion layer and the first substrate.

8. The liquid crystal display as claimed in claim 7, wherein
the first color conversion layer is a red color conversion layer, the first color filter is a red color filter,
the second color conversion layer is a green color conversion layer, and the second color filter is a green color filter.

9. The liquid crystal display as claimed in claim 1, wherein
the liquid crystal display is bent to have a curvature.

10. A method for manufacturing a liquid crystal display, comprising:
forming a first color conversion layer, a second color conversion layer, and a transmitting layer on a first substrate;
forming a planarization layer on the first color conversion layer, the second color conversion layer, and the transmitting layer;
forming a first polarization layer on the planarization layer;
forming a thin film transistor on the first polarization layer;
forming a first electrode connected to the thin film transistor;
forming a second electrode at a first surface of a second substrate;
forming a second polarization layer at a second surface of the second substrate; and
forming a light unit adjacent the second polarization layer, wherein incident light from the light unit sequentially passes through the second substrate, the liquid crystal layer, and the first substrate to be emitted.

11. The method as claimed in claim 10, further comprising,
before forming the first color conversion layer, the second color conversion layer, and the transmitting layer,
forming a light blocking layer positioned between the first color conversion layer and the second color conversion layer and between one of the first color conversion layer and the second color conversion layer, and the transmitting layer.

12. The method as claimed in claim 10, wherein
the first color conversion layer is a red color conversion layer, and the second color conversion layer is a green color conversion layer.

13. The method as claimed in claim 10, further comprising forming a light blocking member on the first electrode.

14. The method as claimed in claim 10, further comprising, between forming the thin film transistor and forming the first electrode, forming a light blocking member on the thin film transistor.

15. The method as claimed in claim 10, further comprising, between forming the first polarization layer and forming the thin film transistor, forming a polarization insulating layer on the first polarization layer.

* * * * *